United States Patent
Erdos et al.

(10) Patent No.: US 6,239,047 B1
(45) Date of Patent: May 29, 2001

(54) WETTABLE SOFT POLYOLEFIN FIBERS AND FABRIC

(75) Inventors: Valeria Griep Erdos, Huntersville, NC (US); Carlos Viramontes; Rocio Guajardo, both of San Luis Potosi (MX)

(73) Assignee: Polymer Group, Inc., North Charleston, SC (US)

( * ) Notice: Subject to any disclaimer, the term of this patent is extended or adjusted under 35 U.S.C. 154(b) by 0 days.

(21) Appl. No.: 09/253,327

(22) Filed: Feb. 19, 1999

(51) Int. Cl.$^7$ ............................ B32B 27/04
(52) U.S. Cl. .......................... 442/119; 442/118
(58) Field of Search .................. 442/118, 119

(56) References Cited

U.S. PATENT DOCUMENTS

| | | |
|---|---|---|
| 4,041,203 | 8/1977 | Brock . |
| 4,073,993 | 2/1978 | Lark . |
| 5,063,272 | 11/1991 | Sasse . |
| 5,149,333 | 9/1992 | Sasse . |
| 5,149,576 | 9/1992 | Potts . |
| 5,178,931 | 1/1993 | Perkins . |
| 5,178,932 | 1/1993 | Perkins . |
| 5,405,650 | 4/1995 | Boulanger et al. . |
| 5,439,734 | 8/1995 | Everhart . |
| 5,593,614 | 1/1997 | Laitem . |
| 5,695,829 | 12/1997 | Quincy, III et al. . |
| 5,696,191 | 12/1997 | Nohr . |
| 5,698,074 | 12/1997 | Bareus et al. . |
| 5,698,207 | 12/1997 | Staats . |
| 5,700,286 | 12/1997 | Tartaglia . |
| 5,814,688 * | 9/1998 | Hilti et al. ........................ 524/9 |

* cited by examiner

Primary Examiner—Blaine Copenheaver
Assistant Examiner—Ula C. Ruddock
(74) Attorney, Agent, or Firm—Pyle & Piontek

(57) ABSTRACT

A wettable fiber or filament comprises a melt additive to a thermoplastic polyolefin such as polypropylene. The melt additive is a polyethylene oleiyl ether having the formula:

$$R-O-\{-CH_2-CH_2-O\}_x-CH_2-CH_2-O-H$$

where x is an integer from 1–15, and $$R=CH_3-(CH_2)_7-CH=CH-(CH)_8-$$

When the foregoing ether is added to a melt of polypropylene at levels of 2–15% by weight prior to the extrusion of the fibers or filaments, and the fibers or filaments are formed into fabrics, the fibers, filaments, or fabrics will exhibit permanent wettability, as well as excellent drape and softness. Such fabrics are useful, for example, as the skin contacting inner lining fabric of sanitary articles such as diapers, feminine hygiene products and the like.

3 Claims, No Drawings

WETTABLE SOFT POLYOLEFIN FIBERS AND FABRIC

BACKGROUND OF THE INVENTION

This invention relates to a melt-extrudable thermoplastic polyolefin-based composition which when extruded into films, fibers, nonwoven fabrics or composites, results in a material or nonwoven fabric which exhibits durable wettability.

Polyolefins, especially polypropylene, are used in large quantities to make nonwoven fabrics and films. Polyolefin nonwoven fabrics, such as carded webs, spunbond, meltblown or composites thereof, are preferred as components in sanitary articles, such as single use diapers, feminine hygiene products and incontinence care products. The recognized benefits of polyolefin based, especially polypropylene, fabrics include the relatively low raw material cost, ease of manufacturing, desirable strength to basis weight ratio and softness.

Sanitary articles generally contain an absorbent core component of materials capable of absorbing several times their weight in liquids. Usually the article includes at least one outer covering or lining which contacts the user's skin on one side of the core and the an exterior layer contacting the environment on the other side of the core. Softness and liquid permeability are required of fabrics used for the inner linings. The liquid permeability should take the form of allowing liquid to pass through the fabric and into the inner absorbent core, while not actually absorbing fluids in the process. An additional desired feature is for the inner lining, i.e. the cover sheet for the absorbent core, to remain fluid permeable even after extended wear and repeated insults of fluid, such as routinely occurs with infant diapers in situ. Another highly desired, but difficult to provide, feature of inner lining fabrics is that they resist having liquids collected in the absorbent core bleed back through to the user's skin when pressure is applied—such as an infant sitting in a wet diaper.

Nonwoven fabrics and composites made of cellulosic materials pass and absorb liquids even after repeated insults, but they do not routinely resist the flow back of the retained fluids under pressure. Thermoplastic fibers, such as polyesters and polyolefins have already been described as being preferred for these end uses for economic, aesthetic and strength reasons. However, polypropylene is, by its nature, hydrophobic. When spun into fibers or filaments which are used to form a fabric, the resulting fabric is also hydrophobic or non-wettable. Thus, the fabric must be specially treated or altered in some way to render the fabric wettable, that is, able to allow the passage or transfer of fluids, if the fabric is to be suitable for use as an inner lining fabric for a sanitary article.

For purposes of clarification, it should be noted that absorption indicates that the material actually swells with added water. In contrast, wettability, such as used herein, denotes a change in surface tension that permits a layer of water to form on the surface of a solid, such as a fiber, for the purpose of facilitating the movement of the liquid flow past or through the wettable material.

It is known in the industry that certain surfactants, such as Triton X-100 from Rohm and Haas, can be applied as an aqueous solution or suspension to the surface of hydrophobic fibers, filaments or nonwoven fabrics with the resulting effect of rendering the fibers, filaments or fabrics wettable, although not absorbent. These topical treatments can be applied by any means familiar to one skilled in the art, such as foaming, spraying, dip-and-squeeze or gravure roll. In almost every case, some sort of heating step is required to remove residual water or solvents used to prepare the surfactant solution or suspension. This step adds significantly to the manufacturing costs and complexity. Further, thermoplastics are altered by exposure to heat and careful monitoring of the heating process is required to ensure that fabric properties are not adversely affected. Further, the surfactants are not strongly chemically bonded to the fiber or filament surfaces, such topical treatments are not durable. They tend to wash off during repeated fluid insults or rub off during use.

In an effort to correct this deficiency, corona discharge treatments have been used to alter the electrochemical potential of the surfaces of fibers or filaments. The effect is to render surfaces more reactive with the result that hydrophobic surfaces become more wettable. However, these electrical potential changes are also not permanent, being particularly subject to environmental effects, such as storage in moist environments.

An additional advancement is the use of surface chemical treatments where the surfactants are covalently bonded to the polymer.

Another approach is the incorporation of chemical agents in the thermoplastic polymer before it is extruded into fibers, filaments or nonwoven fabrics. Agents, such as siloxanes, have been proposed for this purpose. Here, the object is to impart a durable change in the wettability of the fibers or filaments. The performance model theory states that the melt additives become dispersed in the molten polymer and are bound in the matrix when the polymer cools during fiber or filament quenching. Over time, or due to the effects of further processing, the additive rises to the surface of the fibers or filaments, a phenomenon called blooming, imparting durable wettability.

Fatty acid esters have been used as fabric softener compounds, such as described in U.S. Pat. No. 5,593,614. The melt addition of a di-fatty ester to polyolefins is described in U.S. Pat. No. 5,439,734 to Kimberly-Clark. The melt addition of this di-acid ester was described as imparting wettability durable up to three fluid insults.

Polyethylene glycols esters (PEG esters) have been recognized as useful in the preparation of hydrogels and wettable membranes, directed towards wound care, as described in U.S. Pat. Nos. 5,700,286 and 5,698,074. PEG esters have also been used to topically treat hydrophobic fibers, as described in U.S. Pat. No. 4,073,993.

SUMMARY OF THE INVENTION

In accordance with the present invention, a melt additive to a thermoplastic polyolefin such as polypropylene glycol is provided in which the additive is a polyethylene oleiyl ether having the formula:

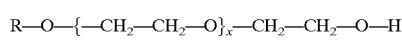

where:

x is an integer from 1–15, and

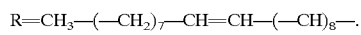

When the foregoing ether is added to a melt of polypropylene at levels of two to fifteen percent by weight prior to the extrusion of the fibers or filaments, and the fibers or filaments are formed into fabrics, the fibers, filaments or fabrics will exhibit permanent wettability, as well as an unanticipated improvement in softness and drape. It has been demonstrated by Transmission Electron Microscopy that the PEG oleiyl ether is distributed throughout the cross-section of the fibers or filaments with a concentration at the surface skin of the formed fibers or filaments.

The wettable fabrics produced from the fibers or filaments of this invention are particularly useful, for example, as the skin contacting inner lining fabric of sanitary articles, particularly single use diapers, feminine hygiene products or incontinence care products. The fabrics produced may also have utility in wet and dry wipes, filter media, battery separators and the like.

DETAILED DESCRIPTION OF THE INVENTION

This invention is applicable to processes in which a thermoplastic polymer, especially a polyolefin such as polyethylene or polypropylene, is melted and extruded to form fibers or filaments. In accordance with known technology such as continuous filament spinning for yarn or staple fiber, and nonwoven processes such as spunbond production and meltblown production, the fibers or filaments are formed by extrusion of the molten polymer through small orifices. In general, the fibers or filaments thus formed are then drawn or elongated to induce molecular orientation and affect crystallinity, resulting in a reduction in diameter and an improvement in physical properties. In nonwoven processes such as spunbonding and meltblowing the fibers or filaments are directly deposited onto a foraminous surface, such as a moving flat conveyor and are at least partially consolidated by any of a variety of means including, but not limited to, thermal, mechanical or chemical methods of bonding. It is known to those skilled in the art to combine processes or the fabrics from processes to produce composite fabrics which possess certain desirable characteristics. Examples of this are combining spunbond and meltblown to produce a laminate fabric that is best know as SMS, meant to represent two outer layers of spunbond fabric and an inner layer of meltblown fabric. Additionally either or both of these processes may be combined in any arrangement with a staple fiber carding process or bonded fabrics resulting from a nonwoven staple fiber carding process. In such described laminate fabrics, the layers are generally at least partially consolidated by one of the means listed above. The invention is also applicable to melt extruded bicomponent fibers, wherein one of the components is a polyolefin.

Spunbond filament sizes most useful for wettable fabrics of the anticipated type are 1.0–3.2 denier. Meltblown fibers typically have a fiber diameter of less than 15 microns and most typically for the anticipated applications are fiber diameters less than 5 microns, ranging down to the submicron level. Webs in a composite construction may be processed in a wide variety of basis weights.

As described, thermoplastic polypropylene fibers, which are typically extruded at temperatures in the range of 210°–240° C., are inherently hydrophobic in that they are essentially non-porous and consist of continuous molecular chains incapable of attracting or binding to water molecules. As a result, untreated polypropylene fabrics, even while having an open pore structure, tend to resist the flow of liquids such as water or urine through the fabric, or from one surface to the other.

In accordance with the present invention, a PEG ether, specifically a PEG oleiyl ether is incorporated into a thermoplastic polyolefin, such as polypropylene, in the melt and is extruded with the polyolefin into the form of fibers and filaments which are then quenched, attenuated and formed into fabrics, either in a subsequent or concomitant processing step. The general formula for the preferred compound is:

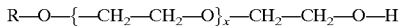

where:

x is an integer from 1–15, and

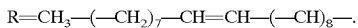

The PEG oleiyl ether is characterized by IR bands at 3436 cm$^{-1}$ (glycol ether) and near 1123 cm$^{-1}$ (ether linkage).

The PEG ether may be compounded with the polymer pellets which are to be melt extruded. To improve the processing, the compound may be preformulated or compounded into a low MFR polypropylene which may also contain a small amount of an inorganic powder, such as talc, and an antioxidant. The total amount of PEG ether added is 2 to 15% on a weight by neat polypropylene weight basis. For many applications, the most preferred range is from about 3 to about 7 percent by weight. Addition levels below the indicated minimum level do not produce the desired degree of wettability in the fibers, filaments or fabrics. Addition levels above the indicated maximums do not provide significant additional performance benefits. One suitable ether compound, identified by the designation Techmer S-215834E25, is available from Techmer PM.

Nonwoven fabrics made from internally treated polypropylene exhibit properties which are greatly superior to other internal additives or topical treatments known in the prior art. The PEG ether compound is observed by Transmission Electron photomicrographs to be distributed throughout the fiber cross section, while showing a tendency to migrate toward the surface skin of the fibers or filaments. This results in the observed improved wettability of naturally hydrophobic fibers, filaments or fabrics, and also contributes to the durability of that modification, such that the fibers, filaments and fabrics do not lose their wettability upon aging or handling. Further, the improved wettability is stable to repeated fluid insults, up to seven times, without a loss of performance, even over extended time periods. Finally, there is an unexpected aesthetic benefit as the fabrics produced from the fibers or filaments of this invention are considerably softer than untreated fabrics. This feature can be measured as a significant change in the coefficient of static or dynamic friction.

While the present invention has been described especially in connection with nonwoven polyolefin fabrics, particularly polypropylene fabrics, it will be apparent to those skilled in the art that the internally treated fibers or filaments may also be formed into threads or yarns for weaving or knitting in conventional textile processes.

Also, irrespective of the desired property of wettability, the melt additive of the present invention may be employed where fabric softness and drape are the most important or controlling criteria.

In connection with nonwoven fabrics, it will be appreciated by those skilled in the art that many of the properties of nonwoven fabrics are influenced by factors not directly relevant to the present invention. These factors include, for example, basis weight, fiber diameter, degree of and type of bonding of the fibers and the synergistic effects and influence of composite structures, such as the already described SMS structures.

It will also be appreciate by those skilled in the art that the performance benefits associated with the practice of this invention are not limited to single component fibers. Polyolefin bicomponent fibers, particularly side-by-side or sheath-core fibers of polypropylene and polyethylene would be expected to demonstrate the same practical benefits as single component fibers of either type. It would be particularly efficacious to include the melt additive only in the polyethylene component as that softer polymer could be expected to promote more efficient blooming of the PEG ether to the surface of that component of the fiber or filament.

In addition, it is often desirable to impart wettability and softness to melt extruded polyolefin films. Such films, in perforated form, are widely used as cover sheets for sanitary articles.

In one preferred embodiment for cover stock for sanitary articles, improvements in wetback properties can be improved by the use of two or more layers of fabric bonded together. Examples include two spunbond layers or an SMS fabric in which the meltblown layer is devoid of the PEG ether.

What is claimed is:

1. A soft, durably wettable polyolefin fiber or filament, said fiber or filament comprising from about 2 to 15 percent by weight of a polyethylene glycol oleiyl ether, and the remainder as a thermoplastic polyolefin, said ether being dispersed in said thermoplastic polyolefin and in said fiber or filament as a melt blend additive.

2. The fiber of claim 1 wherein said polyethylene glycol oleiyl ether is represented by the formula:

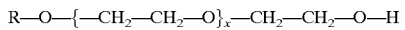

where:

x is an integer from 1–15, and

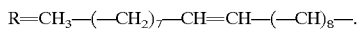

3. A melt extruded polyolefin product in the form of fibers or filament films, said product comprising from about 2 to 15 percent by weight polyethylene glycol oleiyl ether and the remainder as a thermoplastic polyolefin, said ether being dispersed within said thermoplastic polymer as a melt additive.

* * * * *